(12) United States Patent
Littlejohn et al.

(10) Patent No.: US 10,421,560 B2
(45) Date of Patent: Sep. 24, 2019

(54) BOND FIXTURE FOR LEADING EDGE ASSEMBLY

(71) Applicant: Sikorsky Aircraft Corporation, Stratford, CT (US)

(72) Inventors: David Littlejohn, Haslet, TX (US); Sven Roy Lofstrom, Irving, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 130 days.

(21) Appl. No.: 15/232,221

(22) Filed: Aug. 9, 2016

(65) Prior Publication Data

US 2018/0044037 A1 Feb. 15, 2018

(51) Int. Cl.
| | | |
|---|---|---|
| *B64F 5/10* | (2017.01) | |
| *B64C 27/46* | (2006.01) | |
| *B64F 5/40* | (2017.01) | |
| *B29C 73/24* | (2006.01) | |

(52) U.S. Cl.
CPC ............ *B64F 5/10* (2017.01); *B64C 27/46* (2013.01); *B64F 5/40* (2017.01); *B29C 73/24* (2013.01)

(58) Field of Classification Search
CPC ....... B23P 15/04; B23P 6/002; B23P 2700/01; B29L 2031/3076; B64F 5/10; B64C 27/473; B23K 13/01; G01K 3/00; B29C 65/00; B29C 65/02; B29C 70/34; B29C 70/46; B29C 33/02; B29C 35/02
See application file for complete search history.

(56) References Cited

U.S. PATENT DOCUMENTS

| | | |
|---|---|---|
| 4,855,011 A | 8/1989 | Legge et al. |
| 8,449,784 B2 | 5/2013 | Parkos et al. |
| 8,552,347 B2 | 10/2013 | Boschet et al. |
| 9,144,944 B1 | 9/2015 | White |

*Primary Examiner* — Moshe Wilensky
(74) *Attorney, Agent, or Firm* — Cantor Colburn LLP

(57) ABSTRACT

A bond fixture includes a frame defining a chamber for receiving a component. At least one bladder assembly is connected to the frame. The at least one bladder assembly includes a pad for contacting the component. A position of the pad relative to the component is controlled by a pressure of the bladder assembly. A caul assembly is adapted to thermally couple to the component to heat a localized portion of the component.

11 Claims, 9 Drawing Sheets

BOND FIXTURE FOR LEADING EDGE ASSEMBLY

BACKGROUND OF THE INVENTION

Exemplary embodiments of the invention relate to a rotary-wing aircraft and, more particularly, to a bond fixture for use during the manufacture or repair of a rotor blade of a rotary-wing aircraft.

Rotary wing aircraft include a plurality of main rotor blades coupled to a central hub. The rotor blades include aerodynamic surfaces that, when rotated, create lift. The configuration of the main rotor blades, particularly the leading edge thereof, is selected to enhance rotor blade performance, for example to increase the hover and lift capabilities of the rotary-wing aircraft. Rotor blades are subjected to high stresses and strains resulting from aerodynamic forces developed during operation.

BRIEF DESCRIPTION OF THE INVENTION

According to one embodiment of the invention, a bond fixture includes a frame defining a chamber for receiving a component. At least one bladder assembly is connected to the frame. The at least one bladder assembly includes a pad for contacting the component. A position of the pad relative to the component is controlled by a pressure of the bladder assembly. A caul assembly is adapted to thermally couple to the component to heat a localized portion of the component.

In addition to one or more of the features described above, or as an alternative, in further embodiments the pad of the at least one bladder assembly has a contour complementary to the component.

In addition to one or more of the features described above, or as an alternative, in further embodiments the at least one bladder assembly includes a first bladder assembly mounted to a first portion of the frame and a second bladder assembly mounted to a second portion of the frame.

In addition to one or more of the features described above, or as an alternative, in further embodiments the first bladder assembly and the second bladder assembly are arranged in fluid communication with a pressure source.

In addition to one or more of the features described above, or as an alternative, in further embodiments a pressure is equalized between the first bladder assembly and the second bladder assembly.

In addition to one or more of the features described above, or as an alternative, in further embodiments the caul assembly includes a heater.

In addition to one or more of the features described above, or as an alternative, in further embodiments the caul assembly further includes an inner caul and an outer caul and the heater is positioned between the inner caul and the outer caul.

In addition to one or more of the features described above, or as an alternative, in further embodiments heat output by the heater is uniform across the rotor blade.

In addition to one or more of the features described above, or as an alternative, in further embodiments heat output by the heater varies across the rotor blade.

In addition to one or more of the features described above, or as an alternative, in further embodiments comprising at least one strap associated with the frame to secure the bond fixture to the component.

In addition to one or more of the features described above, or as an alternative, in further embodiments comprising a trailing edge guard mounted to the component opposite the frame.

In addition to one or more of the features described above, or as an alternative, in further embodiments the bond fixture and the trailing edge guard cooperate to affix to the component.

In addition to one or more of the features described above, or as an alternative, in further embodiments comprising a cuff guard mounted to a portion of the component, opposite the frame.

According to another embodiment, a method of bonding a leading edge fairing to a rotor blade includes installing the leading edge fairing about the rotor blade and mounting a bond fixture about the leading edge fairing. Localized and constant heat and pressure is applied to the leading edge fairing via the bond fixture.

In addition to one or more of the features described above, or as an alternative, in further embodiments comprising installing a caul assembly about the leading edge fairing, the caul assembly being positioned within the bond fixture.

In addition to one or more of the features described above, or as an alternative, in further embodiments mounting the bond fixture to the rotor blade includes tightening at least one strap about the bond fixture and the rotor blade.

In addition to one or more of the features described above, or as an alternative, in further embodiments mounting the bond fixture to the rotor blade includes coupling the bond fixture to at least one of a trailing edge guard and a cuff guard mounted to the rotor blade, opposite the bond fixture.

In addition to one or more of the features described above, or as an alternative, in further embodiments comprising connecting a power source to the bond fixture to apply heat to the leading edge fairing.

In addition to one or more of the features described above, or as an alternative, in further embodiments comprising connecting an air supply to the bond fixture to apply pressure to the leading edge fairing.

In addition to one or more of the features described above, or as an alternative, in further embodiments pressure applied to the rotor blade by a pad is adjusted when air form an air supply is provided to a bladder operably coupled to the pad.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
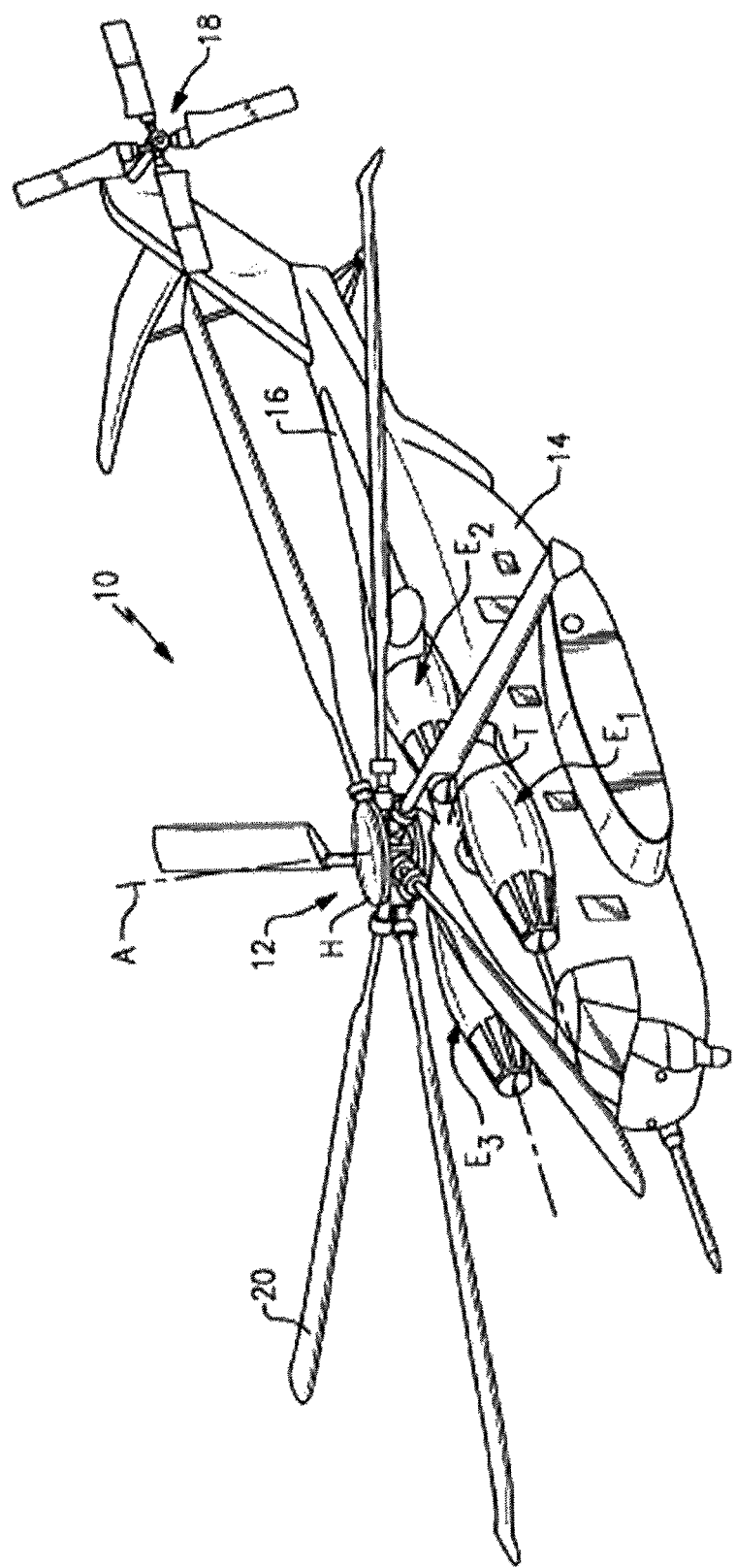
FIG. 1 is a perspective view of an example of a rotary wing aircraft.

FIG. 1 schematically illustrates a rotary-wing aircraft 10 having a main rotor system 12. The aircraft 10 includes an airframe 14 having an extending tail 16 which mounts a tail rotor system 18, such as an anti-torque system for example. The main rotor assembly 12 is driven about an axis of rotation A through a main gearbox (illustrated schematically at T) by one or more engines E. The main rotor system 12 includes a plurality of rotor blade assemblies 20 mounted to a rotor hub assembly H. Although a particular helicopter configuration is illustrated and described in the disclosed non-limiting embodiment, other configurations and/or machines, such as high speed compound rotary-wing aircraft with supplemental translational thrust systems, dual contra-rotating, coaxial rotor system aircraft, turbo-props, tilt-rotors, and tilt-wing aircraft are also within the scope of the invention.

Figure 2:
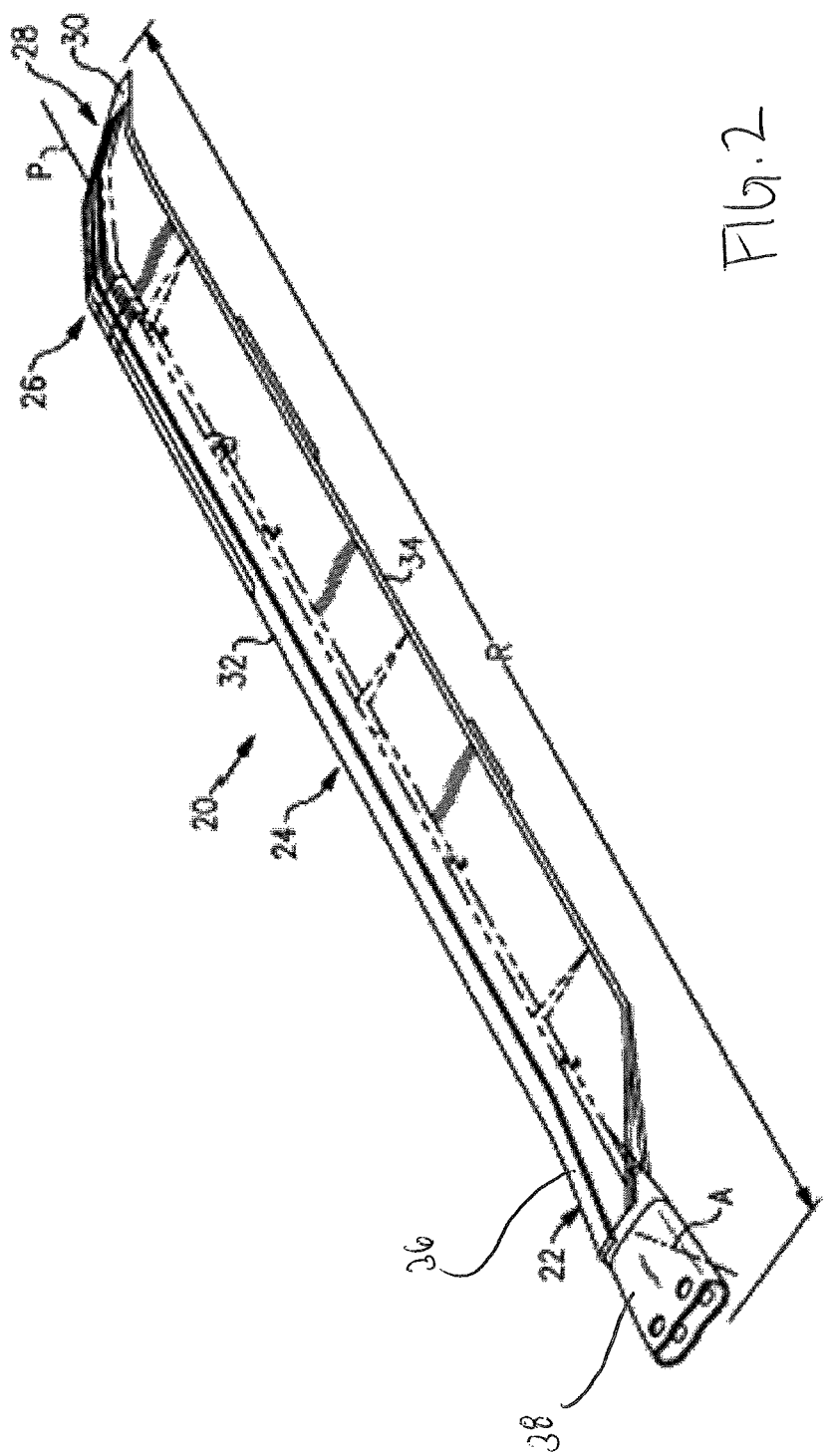
FIG. 2 is a perspective view of an example of a rotor blade of a rotary wing aircraft.
Figure 3:
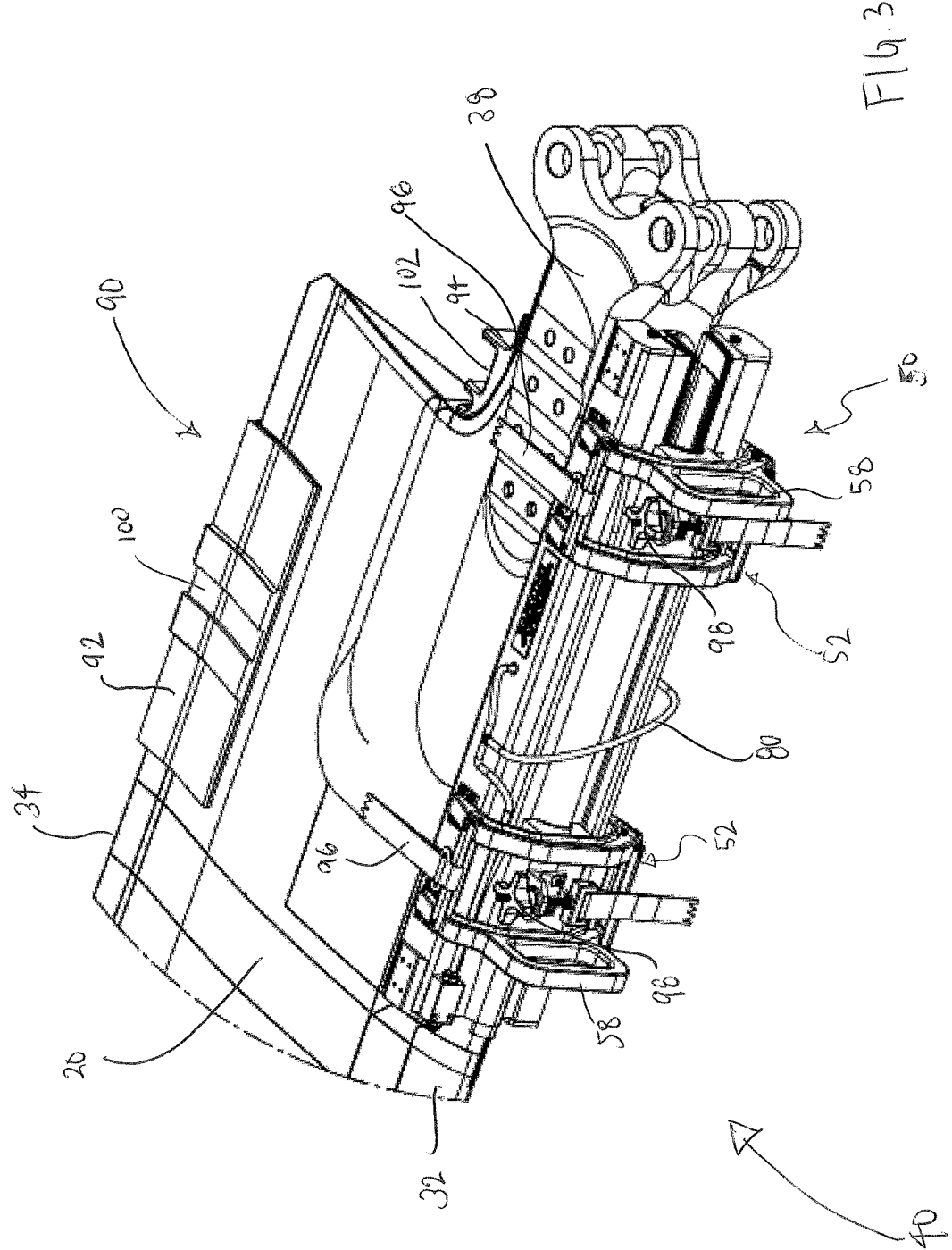
FIG. 3 is a perspective view of a rotor blade having a bond assembly mounted thereto according to an embodiment.
Figure 4:
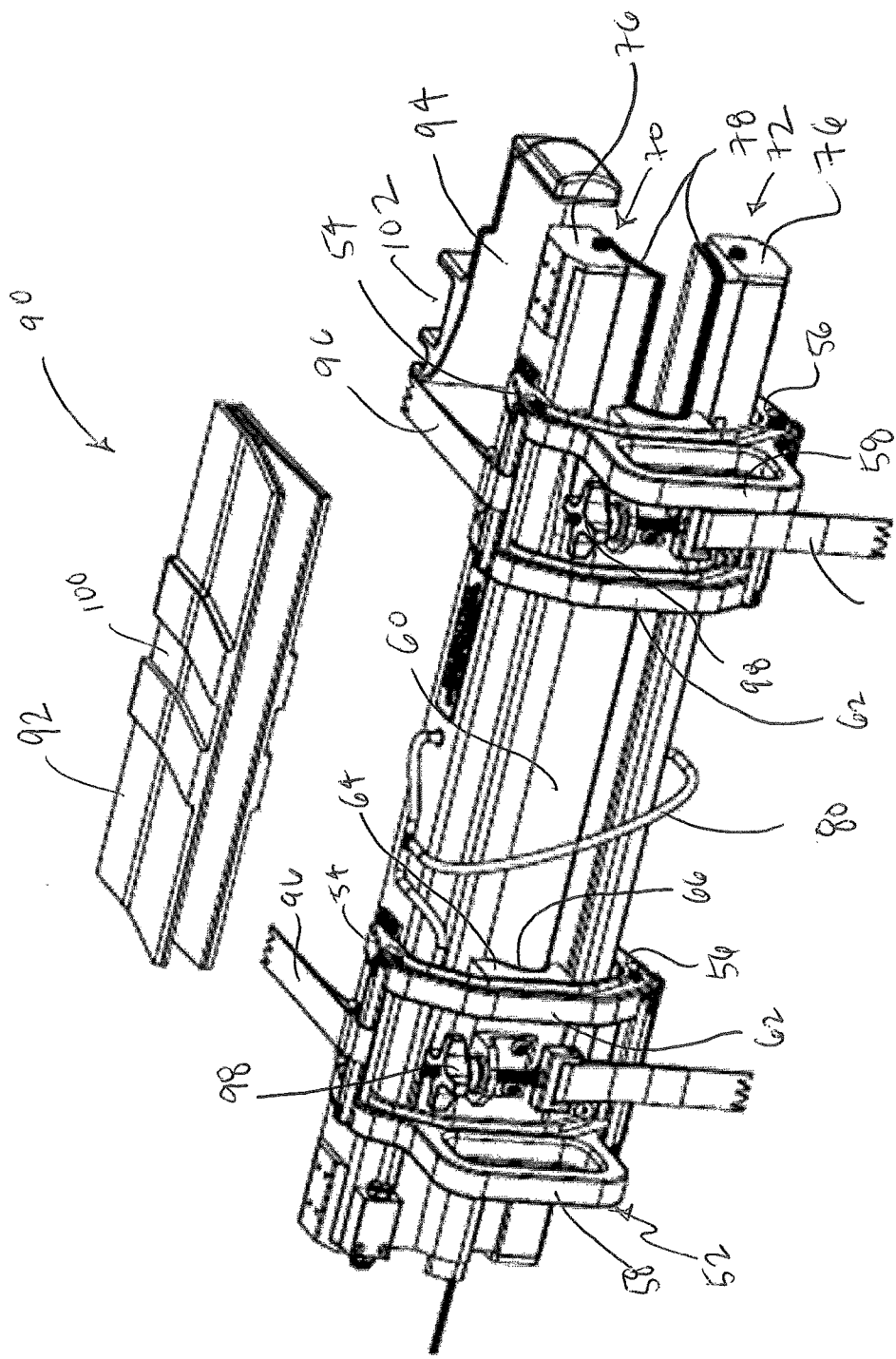
FIG. 4 is a perspective view of a bond assembly according to an embodiment.
Figure 5:
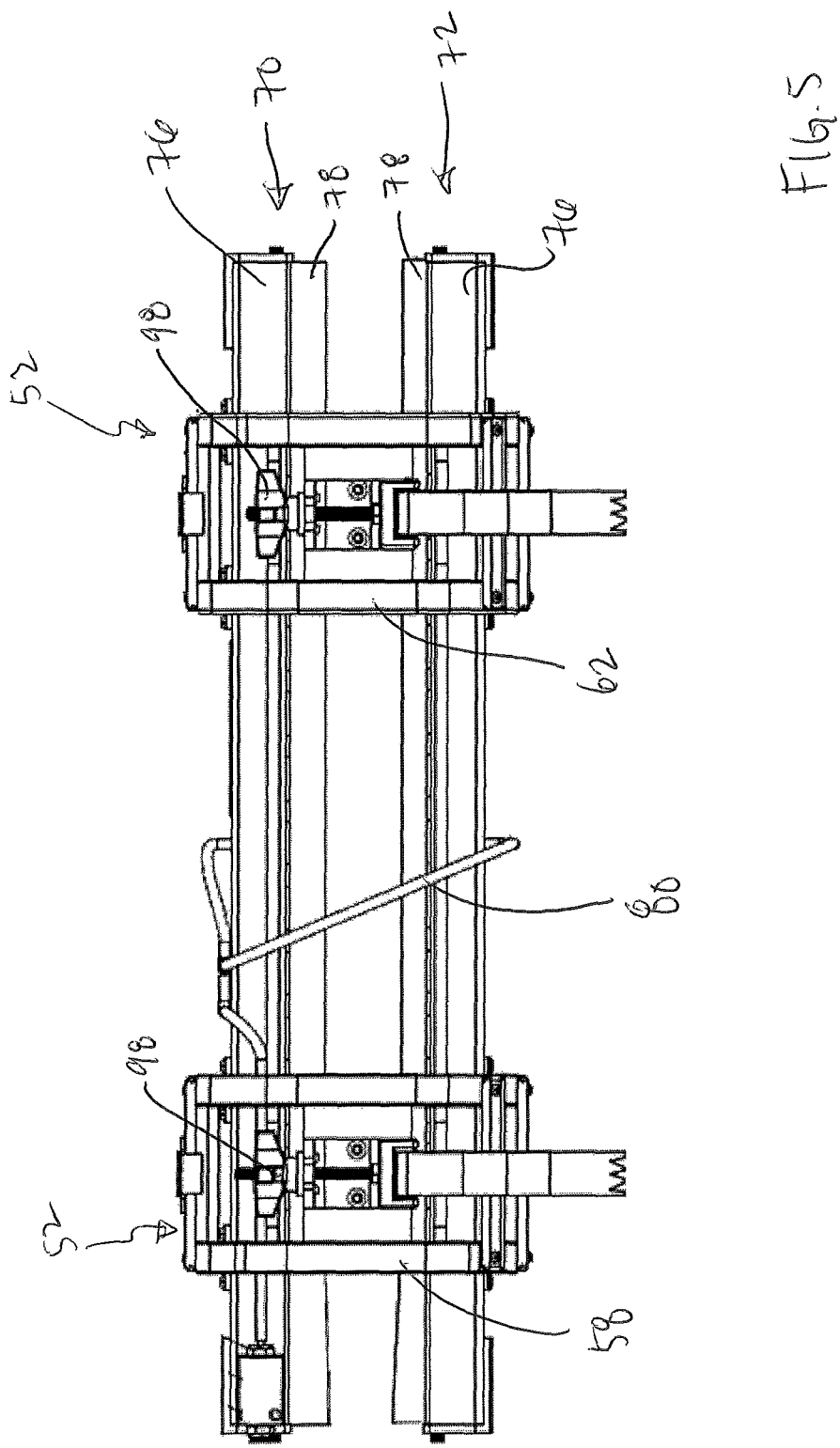
FIG. 5 is a front view of the bond assembly according to an embodiment.
Figure 6:
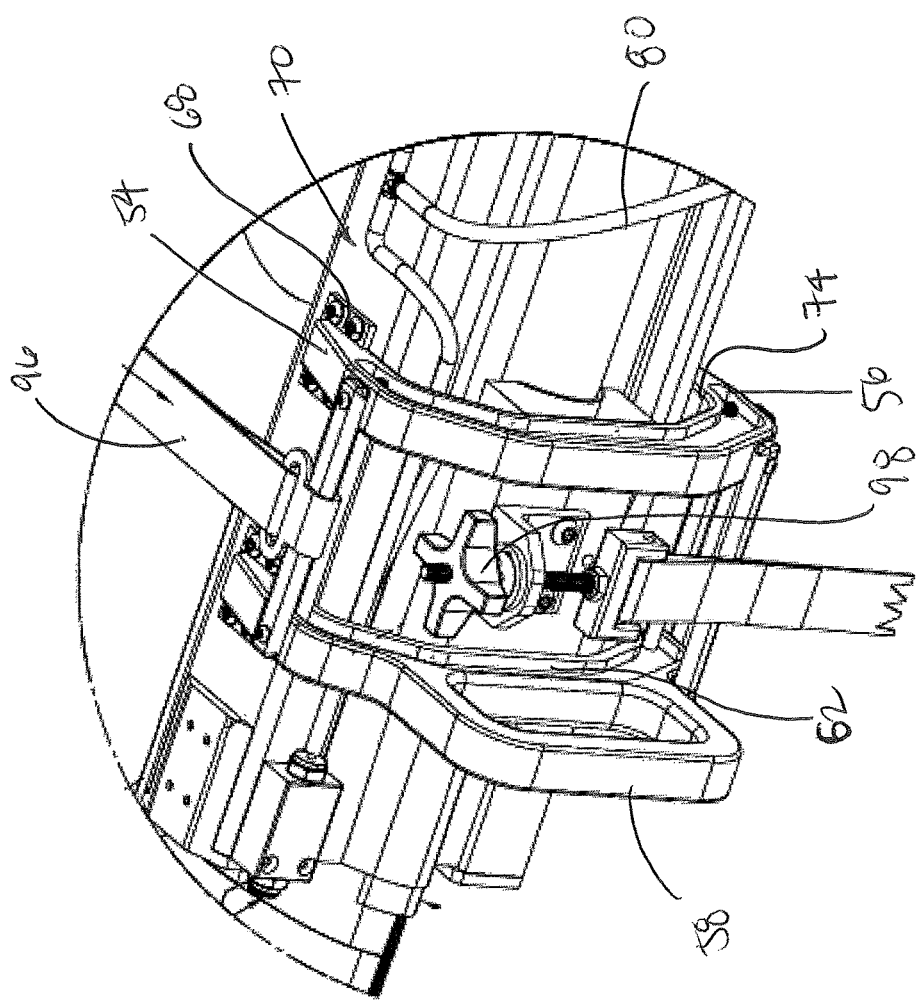
FIG. 6 is a detailed perspective view of a first bond fixture of the bond assembly according to an embodiment.
Figure 7:
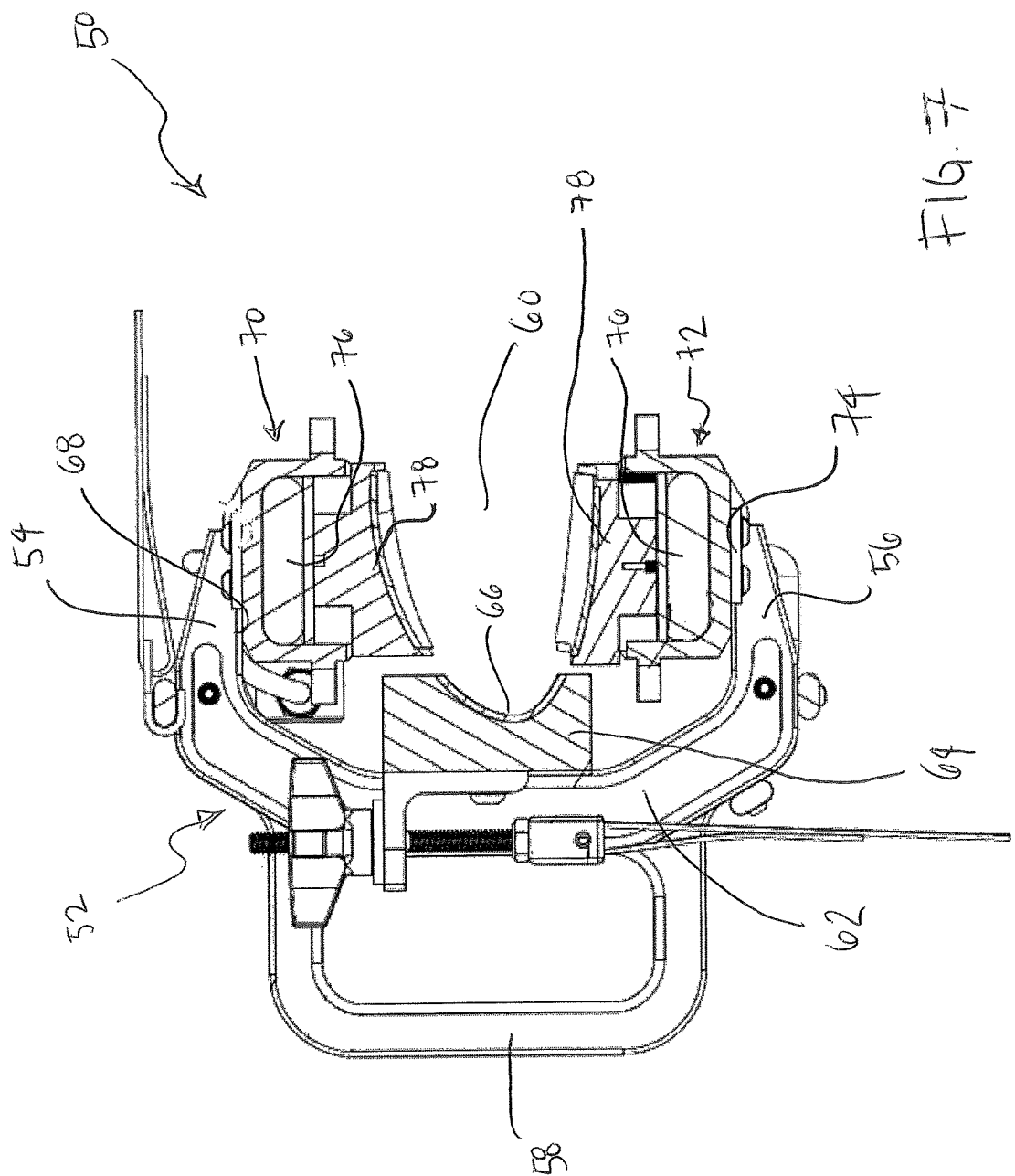
FIG. 7 is a cross-sectional view of the first bond fixture according to an embodiment.
Figure 8:
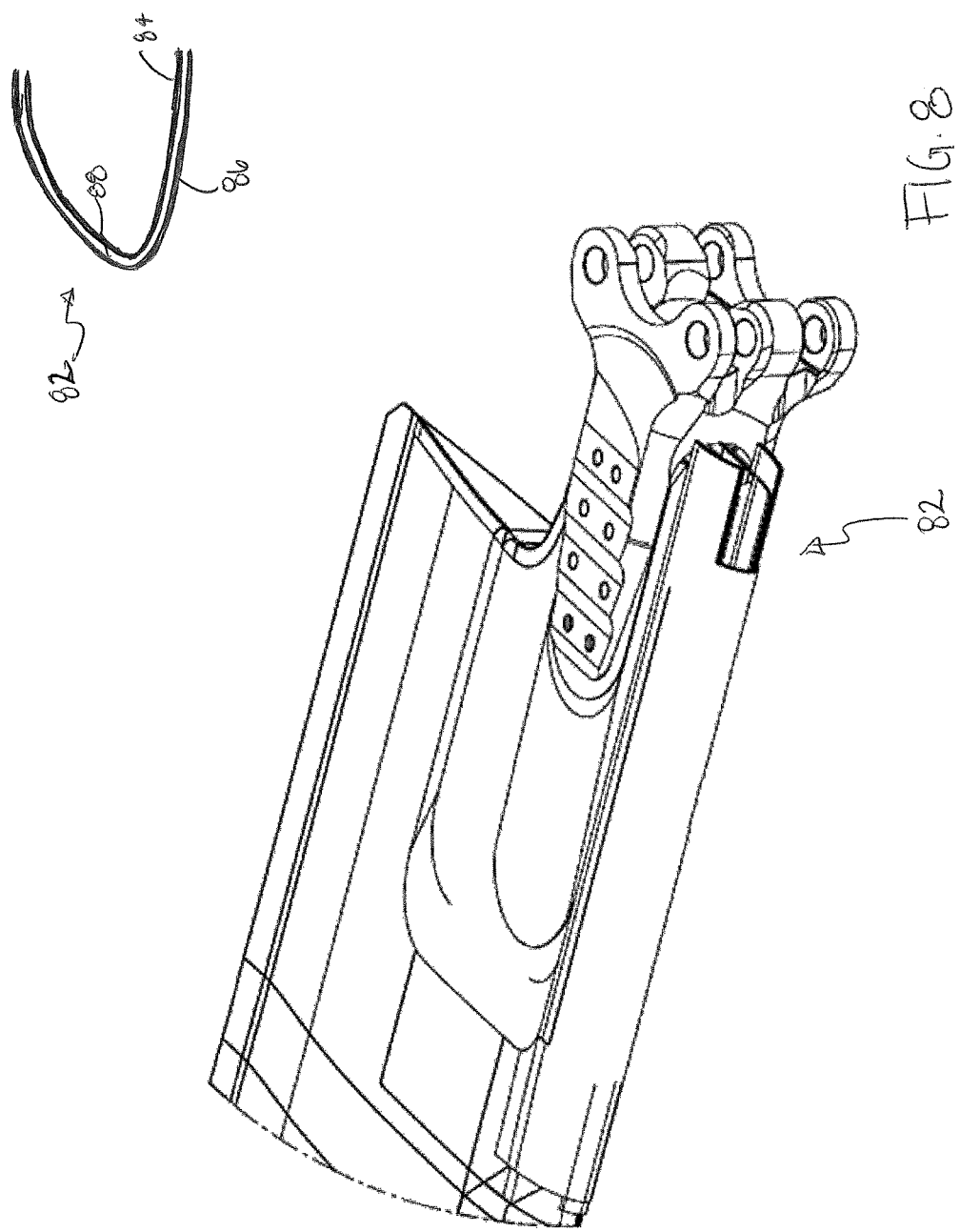
FIG. 8 is a perspective view of a caul assembly according to an embodiment.

Referring to FIG. 2, each rotor blade assembly 20 of the rotor assembly 12 generally includes a root section 22, an intermediate section 24, a tip section 26, and a tip cap 28. Each rotor blade section 22, 24, 26, 28 may define particular airfoil geometries to tailor the rotor blade aerodynamics to the velocity increase along the rotor blade span. As, illustrated, the rotor blade tip section 26 may include an anhedral form 27 (not shown); however, a tip section having any angled or non-angled form such as cathedral, gull, bent, and other non-straight forms are also contemplated herein.

The rotor blade sections 22-28 define a span R of the main rotor blade assembly 20 between the axis of rotation A and a distal end 30 of the tip cap 28 such that any radial station may be expressed as a percentage in terms of a blade radius x/R. The rotor blade assembly 20 defines a longitudinal feathering axis P between a leading edge 32 and a trailing edge 34. The distance between the leading edge 32 and the trailing edge 34 defines a main element chord length Cm. In an embodiment, a leading edge fairing 36 is mounted to the leading edge 32 of the rotor blade 20 at the root section 22 of the rotor blade 20, adjacent the blade cuff 38. The leading edge fairing 36 at least partially defines an airfoil contour of the rotor blade 20.

A bond assembly 40 for bonding the leading edge fairing 36 to the rotor blade 20 is illustrated in FIGS. 3-8. The bond assembly 40 includes a first fixture 50 configured to mount about the leading edge 32 of the rotor blade 20. The first fixture 50 includes one or more generally U or C-shaped frames 52 having a first arm 54 and second arm 56 coupled at a first end thereof. The first and second arm 54, 56, may but need not be substantially identical. In the illustrated, non-limiting embodiment, the first and second arms 54, 56 are arranged parallel to and opposite one another in a generally aligned manner such that the first and second arms 54, 56 are separated by a distance. In an embodiment, a handle 58 is mounted to a portion of the frame 52, such as an exterior surface thereof for example, to aid in installation and removal of the first fixture 50.

The frame 52 defines a chamber 60 within which the leading edge 32 of the rotor blade 20 is positionable. In the illustrated, non-limiting embodiment, a pad 64 is mounted to the portion 62 of the frame 52 coupling the first and second arms 54, 56 within the chamber 60. The pad 64 has an inlet 66 (FIG. 7) formed therein having a contour generally complementary to the leading edge 32 of the rotor blade 20. As a result, when the bond assembly 40 is mounted to a rotor blade 20, the leading edge 32 is disposed within the inlet 66. In other embodiments, the inlet 66 may be integrally formed with the frame 52. It should be understood that the frame 52 illustrated and described herein is intended as an example only and that a frame 52 having another configuration is also within the scope of the disclosure.

In the illustrated, non-limiting embodiment, the first fixture 50 includes a plurality of frames 52 mounted at different positions over the span of the rotor blade 20 within the root section 22. However, other configurations, such as where a frame 52 extends over the span of the rotor blade 20 a distance substantially equal to the leading edge fairing 36 for example, are contemplated herein.

Connected to or integrally formed with a first surface 68 of the first arm 54, adjacent the chamber 60, is a first bladder assembly 70. In embodiments where the first fixture 50 includes a plurality of frames 52, the fixture 50 may include a plurality of first bladders assemblies 70, or alternatively may include a single first bladder assembly 70 coupled to the first arm 54 of each of the plurality of frames 52. Similarly, a second bladder assembly 72 is connected to or integrally formed with a first surface 74 of the second arm 56, adjacent the chamber 60. In embodiments where the first fixture 50 includes a plurality of frames 52, the fixture 50 may include a plurality of second bladders assemblies 72, or alternatively may include a single second bladder assembly 72 coupled to the second arm 56 of each of the plurality of frames 52.

In an embodiment, each first bladder assembly and second bladder assembly comprises a bladder 76 coupled to a pad 78. The pad 78 may be formed from any suitable material that does not damage the surface rotor blade 20 when applying pressure thereto. The pad 78 of the first bladder assembly 70 is configured to apply pressure to a first, upper surface of the rotor blade 20 and the pad 78 of the second bladder assembly 72 is configured to apply pressure to a second, lower surface of the rotor blade 20. As a result, the pad 78 of each assembly 70, 72 is formed with a contour generally complementary to the rotor blade 20.

As air pressure is provided to a bladder 76, the bladder is configured to move the corresponding pad 78 into contact with the rotor blade 20. One or more passages, such as formed by conduits 80, fluidly couple the first bladder assembly 70 and the second bladder assembly 72 with an air source (not shown). As a result, the pressure generated by the air source may be equalized between the first and second bladder assemblies 70, 72. However, embodiments where the pressure between the first and second bladder assemblies 70, 72 is uneven or embodiments where the bladder assemblies 70, 72 are independently operable are also contemplated herein.

In an embodiment, a caul assembly 82 (FIG. 8) may be positioned about the leading edge 32 of the rotor blade 20, in overlapping arrangement with the leading edge fairing 36, before the first fixture 50 is mounted to the rotor blade 20. The caul assembly 82 includes an inner caul 84 and an outer caul 86. The inner caul 84 has a contour generally complementary to rotor blade 20 at a position aligned with the leading edge fairing 36 and the adjacent surface of the rotor blade 20. The inner caul 84 is configured to conform the leading edge fairing 36 to a desirable structure. The outer caul 86 has a contour generally complementary to the inner caul 84 and is arranged concentrically with the inner caul 84. When the first fixture 50 is installed about the rotor blade 20, the outer caul 86 is arranged in contact with the first and second bladder assemblies 70, 72.

Disposed between the outer caul 86 and the inner caul 84 is a heater blanket 88. As a result of this location, the heater blanket 88 is maintained in a more rigid state. Depending on the construction of the heater blanket 88, the heat generated by the heater blanket 88 may be constant, or may vary across at least one of the span and the chord of the rotor blade 20.

A second fixture 90, may include a trailing edge guard 92 positioned about the trailing edge 34 of the rotor blade 20, generally opposite the bond assembly 40. The trailing edge guard 92 includes an opening (not shown) generally complementary to the trailing edge 34 of the rotor blade 20 at a position substantially aligned with the splice cap assembly 36. An interior of the trailing edge guard 92 may include a resilient liner (not shown), such as rubber for example, such that any pressure applied to the rotor blade 20 via the trailing edge guard 92 does not damage the rotor blade 20. The second fixture may additionally include a cuff guard 94 removably mounted to the blade cuff 38.

Extending from the first fixture 50 is at least one strap 96 configured to restrict movement of the first fixture 50 relative to the rotor blade 20. The length of the at least one strap 96 may be adjustable, such as via a knob 98 for example, to tighten and loosen the strap 96 for ease of installation and removal of the bond fixture 50 about the rotor blade 20. In an embodiment, the at least one strap 96 includes a loop connectable at both ends to the frame 52 such that the loop is configured to encircle the rotor blade 20. In embodiments where a trailing edge guard 92 is used in conjunction with the bond fixture 50, the loop may extend about an exterior of the trailing edge guard 92, and in some instances may be received within a passageway 100. Alternatively, or in addition, a loop may extend about an exterior of the cuff guard 94, position within a passageway 102 formed therein to restrict sliding movement of the straps 96.

Figure 9:
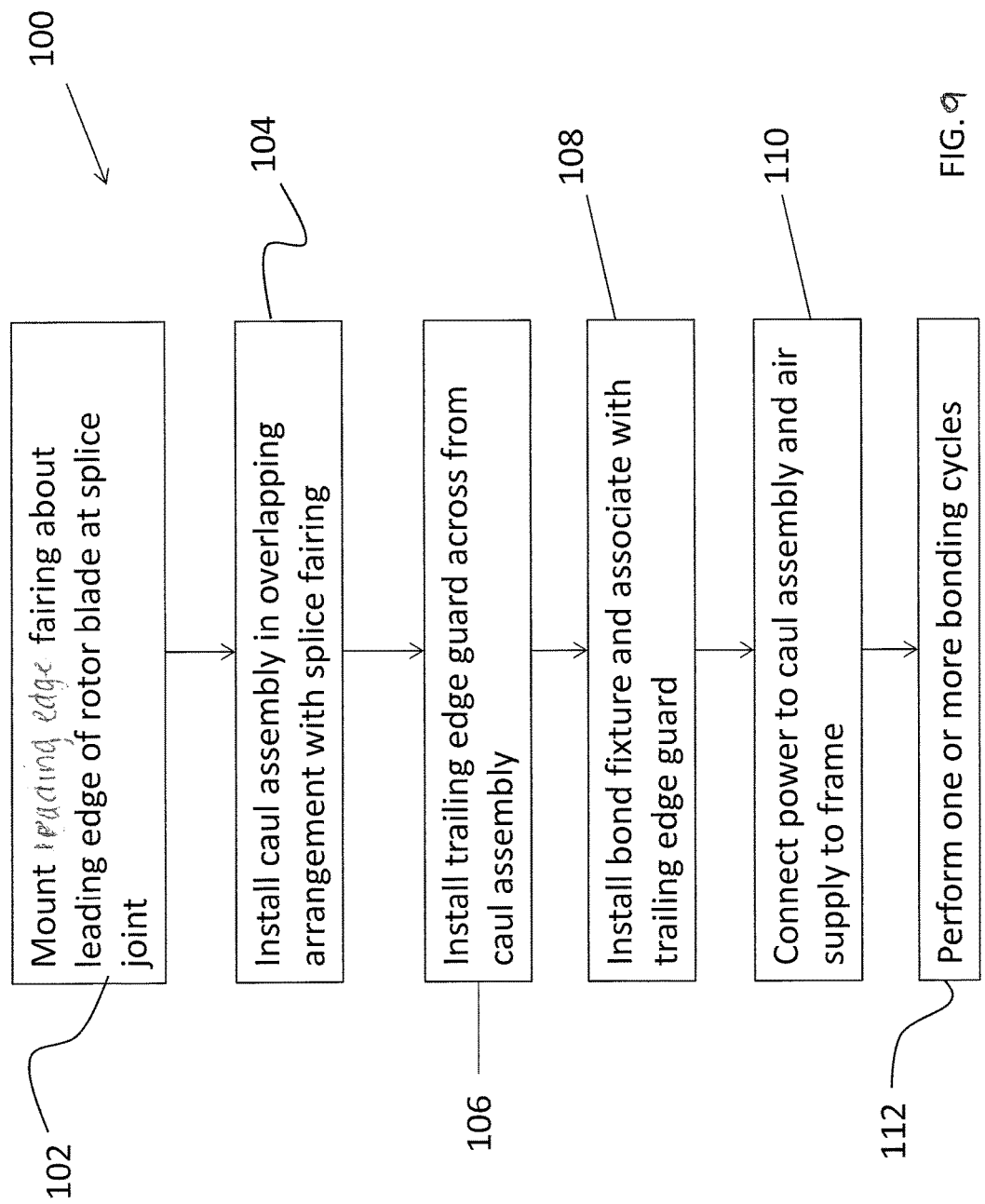
FIG. 9 is a method of using the bond fixture to adhere a leading edge fairing according to an embodiment.

A method 100 of bonding the leading edge fairing 36 to the rotor blade 20 is illustrated in FIG. 9. As shown in block 102, the leading edge fairing 36 is installed about the exterior surface of the rotor blade 20. In an embodiment, installation of the leading edge fairing 36 may include positioning a layer of release film over the leading edge fairing 36 and taping the release film in place. The release film may be substantially larger than the size of the leading edge fairing 36 to provide an adequate area to tape to the rotor blade 20. The caul assembly 80 is then installed over the release film, as shown in block 104. In block 106, a trailing edge guard 90 is mounted about the trailing edge 34 of the rotor blade 20, generally across from the caul assembly 80.

The bond fixture 50 is then mounted about the leading edge 32 of the assembly, as shown in block 108, in an overlapping configuration with the caul assembly 80. In an embodiment, installation of the bond fixture 50 additionally includes securing and/or tightening one or more straps 92 of the bond fixture 50 about the rotor blade 20 to restrict movement of the bond fixture 50 and/or the trailing edge guard 90. In block 110, a power cable assembly and an airline connection are connected to a universal controller. After testing of at least one of the power and a pressure regulator, the universal controller operates the heater and the bladders to simultaneously apply pressure and heat to the leading edge fairing, as shown in block 112. After one or more bonding cycles are complete, the air is removed from the bladders and the bond fixture is removed from the rotor blade, such as in a reverse order as previously described.

The bond fixture 50 illustrated and described herein provides localized heat and pressure to a desired area of the rotor blade. The small size of the tool allows the bonding process to be performed in a fixed location without requiring movement to a separate location to cure. As a result, the need for a large walk-in oven to cure components of the blade 20 is eliminated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A bond fixture comprising:
a plurality of frames, each frame of the plurality of frames defining a chamber for receiving a component, the plurality of frames being spaced over a span of the component;
at least one bladder assembly connected to at least one of the plurality of frames, the at least one bladder assembly including a pad for contacting the component, wherein a position of the pad relative to the component is controlled by a pressure of the bladder assembly;
a caul assembly adapted to thermally couple to the component to heat a localized portion of the component;
a trailing edge guard mounted to the component opposite the plurality of frames; and
at least one strap associated with the plurality of frames to secure the trailing edge guard to the plurality of frames and the component.

2. The bond fixture according to claim 1, wherein the pad of the at least one bladder assembly has a contour complementary to the component.

3. The bond fixture according to claim 1, wherein the at least one bladder assembly includes a first bladder assembly mounted to a first portion of the frame and a second bladder assembly mounted to a second portion of the frame.

4. The bond fixture according to claim 3, wherein the first bladder assembly and the second bladder assembly are arranged in fluid communication with a pressure source.

5. The bond fixture according to claim 3, wherein a pressure is equalized between the first bladder assembly and the second bladder assembly.

6. The bond fixture according to claim 1, wherein the caul assembly includes a heater.

7. The bond fixture according to claim 6, wherein the caul assembly further includes an inner caul and an outer caul and the heater is positioned between the inner caul and the outer caul.

8. The bond fixture according to claim 6, wherein heat output by the heater is uniform across the rotor blade.

9. The bond fixture according to claim 6, wherein heat output by the heater varies across the rotor blade.

10. The bond fixture according to claim 1, wherein the bond fixture and the trailing edge guard cooperate to affix to the component.

11. The bond fixture according to claim 1, further comprising a cuff guard mounted to a portion of the component, opposite the frame.

\* \* \* \* \*